(Model.)
B. McCAUGHEY.
DRIP PAN.
No. 411,670. Patented Sept. 24, 1889.
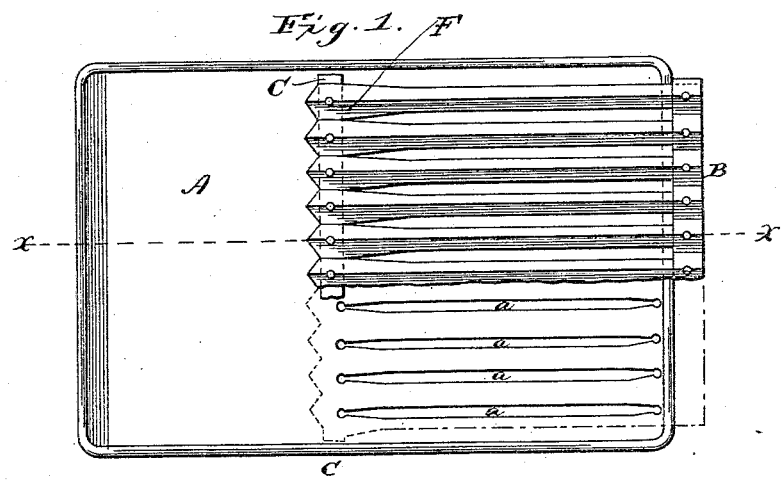
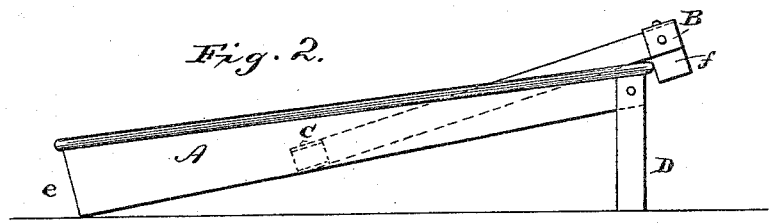
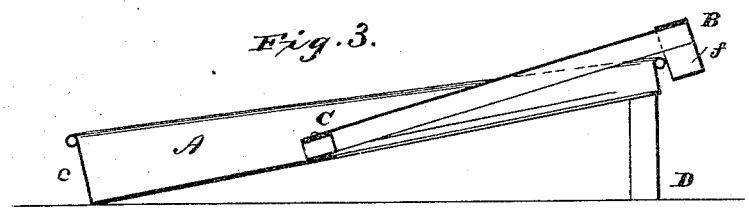
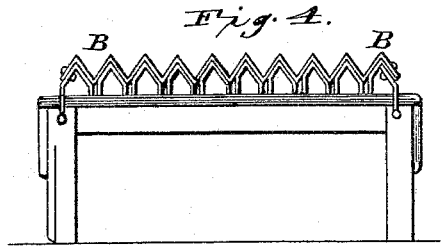
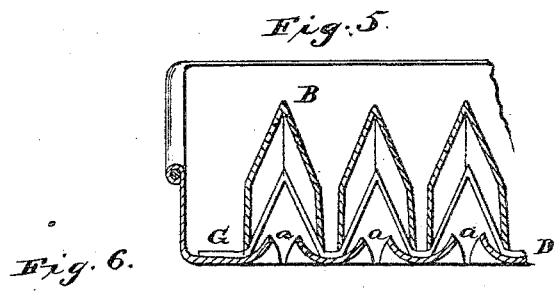
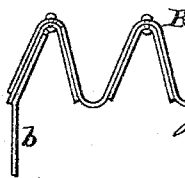
Witnesses
Chas. R. Burr.
Alex J. Stewart.
Inventor.
Bernard McCaughey
by Church & Church
Associate Attorneys.

UNITED STATES PATENT OFFICE.

BERNARD McCAUGHEY, OF PAWTUCKET, RHODE ISLAND.

DRIP-PAN.

SPECIFICATION forming part of Letters Patent No. 411,670, dated September 24, 1889.

Application filed February 4, 1888. Serial No. 263,066. (Model.)

*To all whom it may concern:*

Be it known that I, BERNARD MCCAUGHEY, a citizen of the United States, residing at Pawtucket, county of Providence, and State of Rhode Island, have invented certain new and useful Improvements in Drip-Pans, of which the following is a specification.

The objects of my invention are to provide a pan for roasting or broiling meat or game in the oven in which a perfect circulation of hot air is secured, thus browning all sides of the meat; also, to provide grooves by means of which the juices of the meat are carried into a part of the pan adapted for their reception, thus being preserved from burning.

To these ends the invention consists in certain novel details of construction and combinations and arrangements of parts, to be hereinafter described, and pointed out particularly in the claims at the end of this specification.

In the accompanying drawings, Figure 1 is a top plan view of a pan constructed in accordance with my invention, a portion of the broiler being broken away. Fig. 2 is a side elevation, and Fig. 3 is a longitudinal section, of the pan. Fig. 4 is an end view. Fig. 5 is a cross-sectional view, and Fig. 6 shows a detail of construction.

Similar letters of reference in the several figures indicate the same parts.

The pan A is preferably of the ordinary rectangular shape, formed of Russia iron, with the walls at the forward end somewhat higher than at the rear end, which is elevated to give the proper inclination to the flat bottom of the pan to cause the juices escaping from the meat to flow down to the deeper end. Legs D are preferably employed to elevate the rear end of the pan, although other well-known and equivalent means may be employed to accomplish the same result.

The bottom of the upper half of the pan is perforated by longitudinal slits *a a*, and the portions between the slits are formed into grooves, preferably by bending the edges up, as shown in Fig. 5, to prevent the escape of the juices through the slits.

This construction of pan, it will be seen, is exceedingly simple, easily manufactured, and withal durable and efficient, the juices being collected at the deep lower end in a body, preventing all liability of burning the same under ordinary circumstances, and doing away with the necessity of adding water to increase the bulk of the juice to prevent burning, as has to be done when the pan is level and the juices spread over the entire bottom. It will be further seen that by the construction shown the pan only rests on the stove at one edge, and thus being out of direct contact the bottom of the pan does not become so highly heated as to be liable to burn the contents.

Immediately over the perforated portion of the pan I locate the broiler formed with the perforations or slits alternating with the slots in the pan, the edges of the perforations being turned down to drip the juices into the troughs or grooves formed between the slots in the pan, as shown. The broiler is also preferably formed of Russia iron by corrugating a sheet F and slitting the depressed portions, as shown in Fig. 1, the upper and lower ends being left intact to hold the parts together, and, if desired, strengthening-strips B and C may be applied at top and bottom, portions of the top strip being bent down outside the pan, as at *f*, to hold the broiler at the upper end of the pan. If desired, however, the broiler may be constructed as shown in Figs. 4 and 6, wherein it will be seen that it is formed of separate strips united at the ends by the strip B, a depending portion *b* being provided to engage the edge of the pan and retain the broiler at the top.

Fig. 5 shows the preferred form of the sections of the broiler when made of separate pieces, the sides of the sections being brought down close to the troughs or grooves in the bottom of the pan, preventing all liability of the juices escaping through the slots.

By constructing the pan or broiler as shown and described it will be seen that air can circulate freely on all sides of the meat, thoroughly cooking the same all round, and that the juices formed in the process of roasting are all conveyed to the deep part of the pan and saved.

The construction is exceedingly simple, requiring no special tools for manufacturing, and permits the parts to be readily separated for cleaning, which is facilitated by reason of there being no depressions or elevations in the flat bottom for the lodgment of dirt, &c.

Having thus described my invention, what I claim as new is—

1. The combination, with the inclined rectangular pan having the flat bottom with the slits in the upper portion and the grooves between the slits, of the removable broiler formed with the slits alternating with those in the pan and the retaining devices for holding the broiler at the upper end of the pan, substantially as described.

2. The combination, with the pan having the rectangular body, with the inclined flat bottom having the slits in the upper portion, with the grooves between such slits and the side walls of relatively greater height at the lower end forming a receptacle for the juices, of the broiler at the upper end having the slits alternating with those in the pan, and the depending portions engaging the upper edge of the pan to retain the broiler at the top, substantially as described.

3. The combination, with the pan having the rectangular body, with the inclined flat bottom having the slits at the upper end, with the edges of the slits turned up to form grooves, of the broiler having the corrugated body, with the slits having the downturned edges alternating with those in the pan, and the strengthening-strip at the end, with the depending portion engaging the edge of the pan to retain the broiler at the upper end, substantially as described.

BERNARD McCAUGHEY.

In presence of—
JAMES L. JENKS,
EDWARD W. BLODGETT.